Patented Jan. 4, 1949

2,458,067

UNITED STATES PATENT OFFICE 2,458,067

PROCESS FOR SEPARATING OLEFINS FROM PARAFFINS

Bernard S. Friedman, Chicago, and Russell F. Stedman, Crete, Ill., assignors to Universal Oil Products Company, Chicago, Ill., a corporation of Delaware No Drawing. Application May 2, 1945, Serial No. 591,628

7 Claims. (Cl. 260—677)

This application is a continuation-in-part of our co-pending application Serial No. 459,941, filed September 28, 1942, now Patent No. 2,391,404.

This invention relates to an improvement in processes for the separation of mixtures containing two or more different components and to an improved separating agent therefor.

It is particularly applicable to the treatment of hydrocarbon mixtures for the separation of unsaturated from less unsaturated hydrocarbons. In another modification, the invention may be utilized for the separation of branched chain unsaturated compounds and particularly hydrocarbons from mixtures containing the same and less unsaturated compounds and particularly hydrocarbons, as well as for the separation of lower boiling olefins from higher boiling olefins.

The invention may be utilized in connection with the extraction of a great many types of compounds and the following include only a few examples. The mixtures which may be treated in the present invention may be normally gaseous, normally liquid or mixtures of both normally gaseous and normally liquid compounds. In one embodiment, the invention may be utilized for the separation of, for example, butylenes from butane or for the separation of any olefinic hydrocarbon from its corresponding paraffinic hydrocarbon. Similarly, the invention may be utilized for the separation of butadiene from butylenes and/or butanes or for the separation of any diolefinic hydrocarbon from its corresponding mono-olefinic and/or paraffinic hydrocarbon, as well as for the separation of polyolefinic hydrocarbons. Also, the invention may be utilized for the separation of styrene from ethylbenzene or for the separation of any aromatic hydrocarbon containing an unsaturated side chain from its corresponding aromatic hydrocarbon containing a saturated side chain.

In still another modification, the invention may be utilized for the separation of mixtures of olefinic hydrocarbons from mixtures of paraffinic hydrocarbons, such as, for example, the removal of olefinic hydrocarbons from a gasoline or other distillate containing the same, in order to leave a paraffinic product which, in the case of gasoline, will comprise a distillate which is particularly suitable for use in aviation fuel. Another application of the present process is in the purification of various hydrocarbon fractions. For example, in the isomerization of paraffinic hydrocarbons, it has been found that the presence of substantial amount of olefins is undesirable when employing metal halide catalysts, and the process of the present invention may be utilized as a means of removing the olefinic hydrocarbons from the paraffinic fraction.

In still another modification, the invention may be utilized for the separation of isobutylene by virtue of preferential solubility from mixtures containing the same and normal butylene, or for the separation of any branched chain olefin from its corresponding straight chain olefin. Further, the invention may be utilized for the separation of lower boiling olefinic hydrocarbons by preferential solubility from higher boiling olefinic hydrocarbons. For example, mixtures containing butylene, butane, amylene and pentane cannot be readily separated by purely fractionation means in order to recover the butylenes. The separating agent of the present invention may be utilized to preferentially dissolve the butylenes rather than the paraffins and higher boiling olefins, thus providing a method for accomplishing the desired separation.

It is understood that the results obtained by the treatment of these various mixtures will not necessarily be equivalent.

The charging stock is preferably given a preliminary treatment to remove any sulfur compounds which may be contained therein, in order to avoid any deleterious effect which the sulfur may exert on the separating agent of the present invention. This preliminary treatment may comprise, for example, a caustic wash to remove hydrogen sulphide and/or a more severe treatment to remove other sulfur compounds.

The present invention is characterized by a novel separating agent which broadly comprises a water- or organic-soluble salt of silver dissolved in a water-soluble nitrile. The use of aqueous solutions of silver salts and particularly silver nitrate has heretofore been proposed for the separation of hydrocarbons. However, these aqueous solutions in some cases have a low solvent power for hydrocarbons. By solvent power, it is meant the amount of hydrocarbons dissolved in the separating agent. For example, our experiments have indicated that a 40 weight per cent silver nitrate solution in water will dissolve only 7 cc. of styrene in 100 cc. of the solution. This, it is noted, is a very low solubility, and the present invention discloses an improved method of increasing the solubility of the hydrocarbons in silver salt solutions.

We have found that by dissolving a silver salt in a water soluble nitrile the solvent power of the separating agent is greatly enhanced. For example, a 75 weight per cent silver nitrate solution in acetonitrile will dissolve 127 cc. of styrene in 100 cc. of the solvent. This may be compared to the 38 cc. of styrene dissolved in a 70 per cent silver nitrate-water solution.

Water- or organic-soluble silver salts which may be utilized in accordance with the present invention include the nitrate, perchlorate, fluosilicate, fluoride, etc. Care must be utilized in connection with the perchlorate in order to avoid the presence of perchloric acid, which might cause explosions. It is understood, of course, that the results obtained by the use of the different salts of silver will not necessarily be equivalent.

Of the water-soluble nitriles, acetonitrile and succinonitrile are typical examples of suitable mono- and di-nitriles. Other satisfactory nitriles include propionitrile, butyronitrile, valeronitrile, isovaleronitrile, etc., as examples of mononitriles, and malonitrile and glutaronitrile as examples of dinitriles. Suitable tri- and other polynitriles are also included within the scope of the present invention. It is, of course, within the scope of the invention to utilize the homologs as well as the hydroxy, sulfonic or carboxy derivatives of these compounds, provided that they are water-soluble and non-basic. Likewise, it is within the scope of the invention to utilize mixtures of two or more of these organic compounds, when desired. It is understood that the results obtained by the use of these various alternative compounds are not necessarily equivalent.

Our experiments have indicated that, in certain cases, improved results are obtained when the separating agent contains water in addition to the silver salt and nitrile. The amount of water to be utilized in the separating agent will depend upon the particular silver salt and the particular nitrile being employed. The exact amount of water to add to any particular solution to produce optimum results can easily be determined by a few simple solubility tests in the laboratory.

Our experiments have also indicated that best results are obtained when employing high concentrations of the silver salt. However, the concentration of the silver salt which may be utilized in the separating agent will be limited primarily by its solubility in the particular nitrile utilized.

It is recognized that the selectivity—that is, the absorpion of one or more types of components preferentially to another or other types of components—may, in certain cases, be less than when employing aqueous solution of the silver salt. However, the greatly increased solvent power will, in most instances, more than compensate for the decrease in selectivity when considered from the viewpoint of economical and practical operation.

The temperatures to be employed in the extraction step of the process will depend primarily upon the particular compounds being treated, and the temperature may range from sub-atmospheric up to 150° F. or more. In general, the temperature should be below about 150° F., in order to avoid undesired reactions which may occur at the higher temperatures. Although atmospheric, sub-atmospheric or super-atmospheric pressures may be employed, it is generally preferred to employ sufficient super-atmospheric pressure in order to maintain the hydrocarbons in substantially liquid phase. However, when operating with mixtures containing ethylene, it may not be economical to employ sufficient pressures to obtain liquid phase operation and, in such cases, the process may be conducted in vapor or mixed phase, but not necessarily with equivalent results.

Any suitable type of apparatus may be employed for effecting the desired separation, and this may take the form of a single or multiple stage operation. Batch operations may be effected by contacting the hydrocarbon mixture and separating agent in a vessel which is maintained at the proper temperature and pressure conditions and which preferably is provided with some sort of stirring mechanism. After satisfactory mixing has been accomplished, the mixture may be allowed to settle into an extract and raffinate phase and each of these phases may be separately withdrawn.

Continuous operations are well known in the art at the present time and may take the form of one or more vessels or zones which do or do not contain packing material such as clays, gravel, synthetic materials, etc., and/or fractionating means such as baffle plates, bubble trays, or the like. Either concurrent or countercurrent flow may be employed and the mixture may then be allowed to settle in either the same or different zones in order to separate an extract layer and a raffinate layer. These layers are then separately withdrawn.

After separation of these layers, the hydrocarbons may be recovered from the separating agent by any suitable means. One satisfactory method is by heating to a higher temperature in order to distill the hydrocarbons. However, this method of recovery must not be used when undesired reactions will occur at the higher temperatures due to the catalytic action exerted by the separating agent. Another suitable method of recovering the hydrocarbons from the separating agent is by reducing the pressure of the extract phase, for example, in order to liberate the hydrocarbons. This method may have particular application when the absorption step of the process is conducted under high pressures. In some cases it may be desired to employ both an increased temperature and reduced pressure in the desorption or recovery stage. Another suitable method is the use of a secondary solvent which is immiscible with the separating agent in order to dissolve the hydrocarbons in the secondary solvent. The secondary solvent is preferably of either higher or lower boiling range than the hydrocarbons so that the hydrocarbons may be subsequently readily separated therefrom by fractionation means. It is also within the scope of the invention to recover the hydrocarbons from the separating agent by multiple stage desorption conducted at increasing temperatures and/or decreasing pressures. In this manner, the first portions so desorbed or released will be richer in one type of compound than will be the subsequently desorbed portions.

It is understood, however, that the heretofore specified methods of recovering the hydrocarbons from the separating agent will not necessarily be equivalent in their effectiveness and that the choice as to the particular one to be used in any given instance will depend primarily upon the type of hydrocarbons undergoing treatment.

After separation of the hydrocarbons, the separating agent may of course be recycled to the extraction step for further use therein or, when desired, the separating agent may be utilized for extracting the unsaturated compounds from the raffinate layer or from other hydrocarbon mixtures in the same or different zones.

The following examples are introduced for the purpose of further illustrating the novelty and utility of the present invention but not with the intention of unduly limiting the same.

*Example I*

A solution of 75 percent by weight of silver nitrate in acetonitrile dissolved 127 cc. of styrene per 100 cc. of silver nitrate solution from a pure styrene fraction, whereas a 70 percent by weight silver nitrate solution in water dissolved 38 cc.

Example II

A mixture comprising 22.5 percent butadiene, 27.7 percent n-butylene and 49.8 percent n-butane was extracted with the following separating agent to give the results indicated below:

| Separating Agent | Percent of Butadiene In— | | Percent of n-Butylene In— | | Percent of n-Butane In— | | cc. of Unsaturated Liquid Hydrocarbons Dissolved Per 100 cc. of Separating Agent |
|---|---|---|---|---|---|---|---|
| | Extract | Raffinate | Extract | Raffinate | Extract | Raffinate | |
| 74.1 silver nitrate in acetonitrile | 62.4 | 16.6 | 36.6 | 26.3 | 1.0 | 57.1 | 25.6 |

We claim as our invention:

1. A process for separating olefins from paraffins which comprises contacting a mixture containing olefinic and paraffinic hydrocarbons with a solution of a silver salt in acetonitrile.

2. A process for separating olefins from paraffins which comprises contacting a mixture containing olefinic and paraffinic hydrocarbons with a solution of a silver salt in succinonitrile.

3. A process for separating olefins from paraffins which comprises contacting a mixture containing olefinic and paraffinic hydrocarbons with a solution of silver nitrate in acetonitrile.

4. A process for separating olefins from paraffins which comprises contacting a mixture containing olefinic and paraffinic hydrocarbons with a solution of silver nitrate in succinonitrile.

5. A process for the separation of an unsaturated hydrocarbon from a hydrocarbon mixture containing the same which comprises contacting the mixture with a solution of a silver salt in a water-soluble aliphatic nitrile.

6. A process for separating olefins from paraffins which comprises contacting a mixture containing olefinic and paraffinic hydrocarbons with a solution of a silver salt in a water-soluble aliphatic nitrile.

7. A process for removing unsaturated hydrocarbons from a hydrocarbon distillate which comprises contacting the distillate with a solution of a silver salt in a water-soluble aliphatic nitrile.

BERNARD S. FRIEDMAN.
RUSSELL F. STEDMAN.

REFERENCES CITED

The following references are of record in the file of this patent:

UNITED STATES PATENTS

| Number | Name | Date |
|---|---|---|
| 1,875,924 | Horsley | Sept. 6, 1932 |
| 1,893,586 | Horsley | Jan. 10, 1933 |
| 2,077,041 | Davis et al. | Apr. 13, 1937 |
| 2,246,257 | Kohn | June 17, 1941 |

OTHER REFERENCES

Ebertz et al., J. A. C. S., vol. 59, Jan., 1937, pages 45 to 49.

Weinstein et al., J. A. C. S., vol. 60, April, 1938, pages 836 to 847.